United States Patent [19]
Lentz

[11] 3,800,629
[45] Apr. 2, 1974

[54] ENGINE AND TRANSMISSION POWER TRAINS AND CONTROLS

[75] Inventor: Carl A. Lentz, Mooresville, Ind.

[73] Assignee: General Motors Corporation, Detroit, Mich.

[22] Filed: Oct. 25, 1972

[21] Appl. No.: 300,865

[52] U.S. Cl. ................... 74/869, 74/864, 74/752 C, 74/DIG. 1, 74/731
[51] Int. Cl. ...................... B60k 21/00, F16h 3/74
[58] Field of Search ................... 74/869, 864, 752

[56] References Cited
UNITED STATES PATENTS

| | | | |
|---|---|---|---|
| 3,078,736 | 2/1963 | Meads et al. | 74/752 C X |
| 2,926,543 | 3/1960 | Holdeman et al. | 75/869 |
| 3,691,872 | 9/1972 | Schaefer et al. | 74/869 X |
| 3,713,354 | 1/1973 | Edmunds | 74/869 X |

*Primary Examiner*—Arthur T. McKeon
*Attorney, Agent, or Firm*—A. M. Heiter

[57] ABSTRACT

A power train having a gas turbine engine, a direct coupled multiratio transmission and an automatic trimmed shift control system having a manual valve, shift valves responsive to a torque demand signal provided by gas turbine engine compressor discharge pressure and an output speed signal and timed pressure increasing trimmer valves for establishing the ratio drives and a throttle controlled neutral to first drive pressure regulating and shift control providing when the manual valve is in drive position and the throttle is in an off position, idle fuel feed and zero pressure for a positive neutral, during throttle movement from off position to a low throttle position, continuing idle fuel feed and then a small fuel feed increase and a gradually increasing pressure in a low pressure range controlling the rate of low power engagement of first drive and during further throttle movement from low throttle to full throttle, low to full fuel feed trimmer valve timed increasing pressure in a higher pressure range for high power engagement of first drive and full high pressure for maintaining high power first drive fully engaged and increasing. The throttle pedal controlled pressure regulator is disabled to prevent low pressure range regulation and supply full pressure to the trimmed shift control system by pressure above a low speed to maintain high power drive for overrun braking, during reverse drive as gradual low power engagement of reverse is not required and above a low torque demand or compressor discharge pressure for low pressure regulation only at low engine torque and power engine output.

22 Claims, 8 Drawing Figures

3,800,629
SHEET 1 OF 5
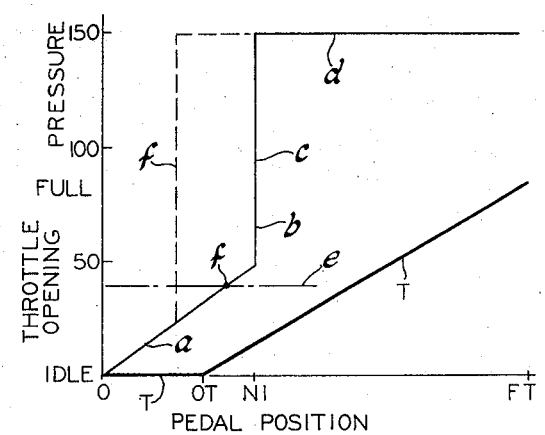
Fig.7
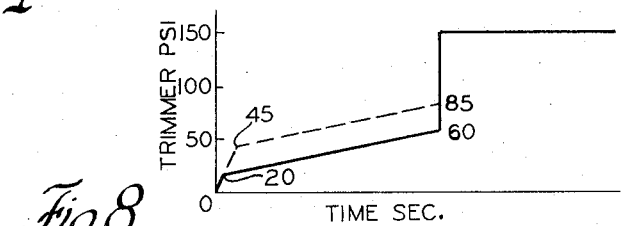
Fig.8
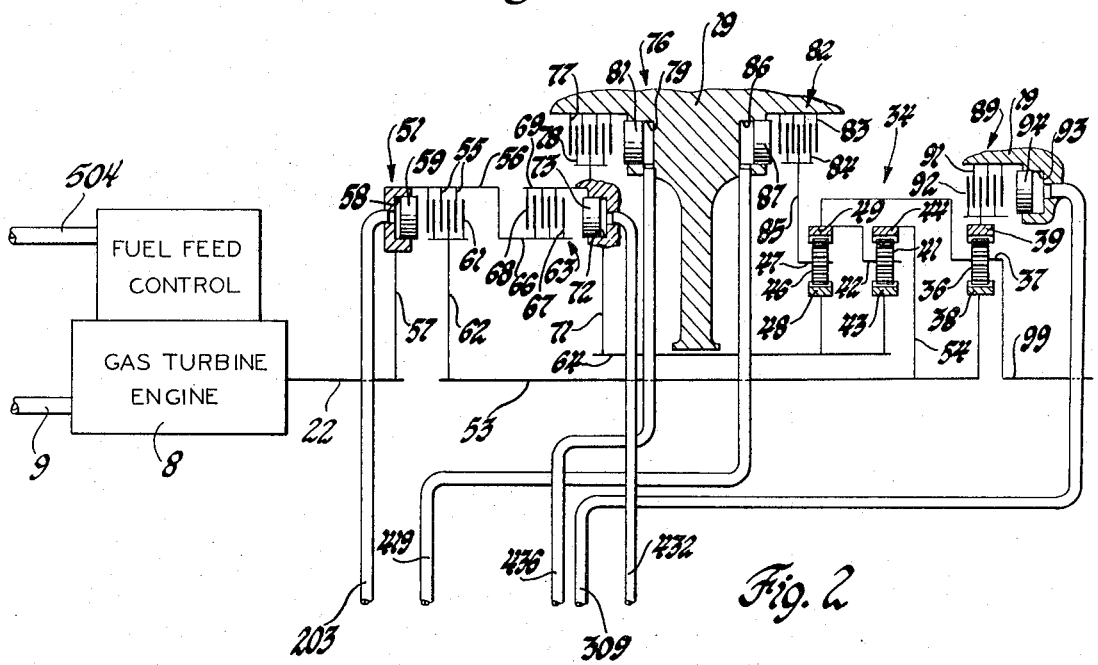
Fig.2
| Fig.2 | | | |
|---|---|---|---|
| Fig.3 | Fig.4 | Fig.5 | Fig.6 |
Fig.1

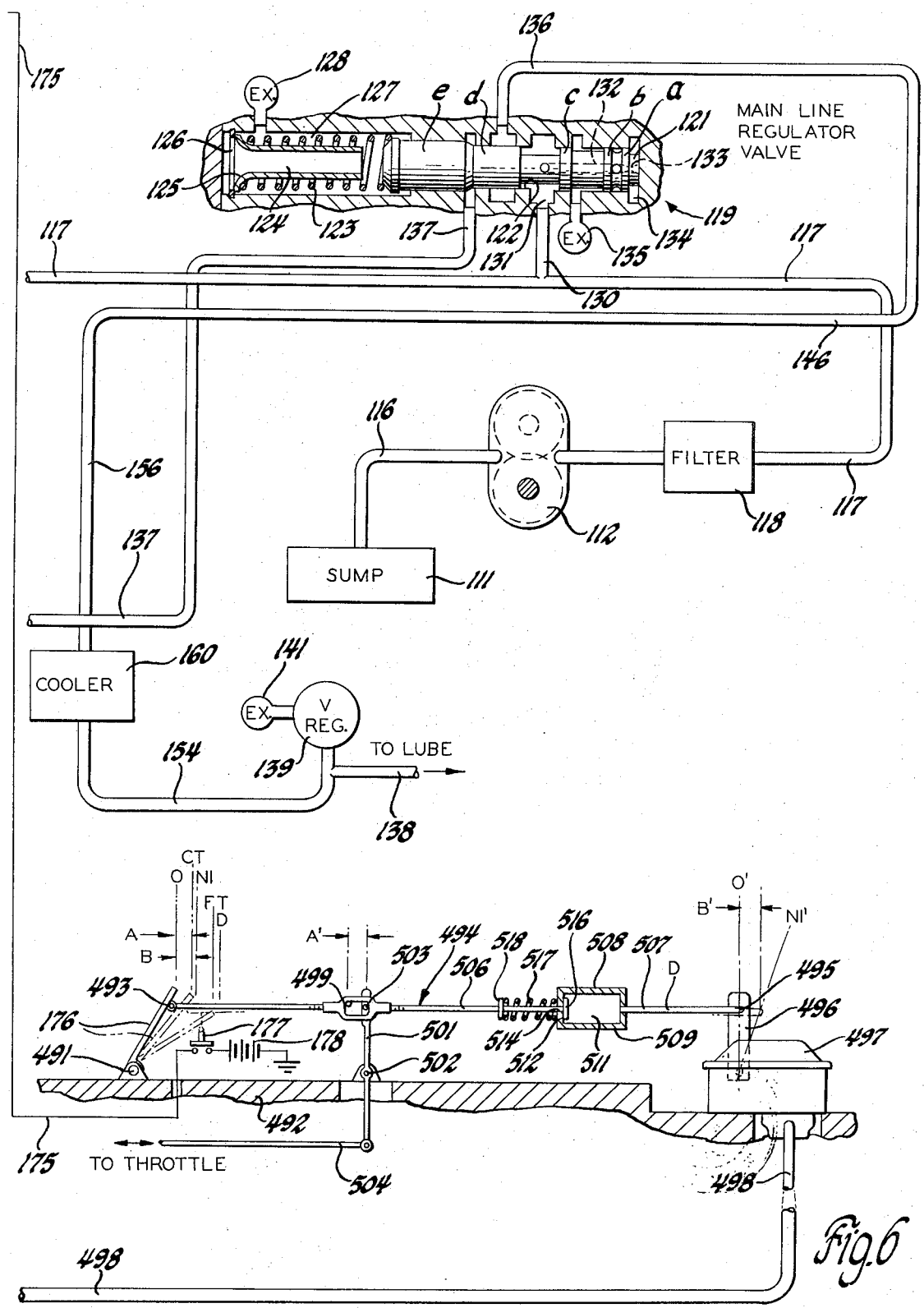

ENGINE AND TRANSMISSION POWER TRAINS AND CONTROLS

This invention relates to engine and transmission power trains and controls and more particularly to a power train having a joint operator controlled first drive rate of engagement control and fuel feed control.

This invention provides an improved power train having an engine, a transmission and controls jointly controlling the engine and transmission to provide operator control of the initial movement and the rate of increase of such movement of a load or vehicle at an operator controlled rate, which may be very slow or faster and from the minimum idle to high torque and power as selected by the operator. The controls are especially suitable for a power train having a gas turbine engine directly driving a gear unit transmission having a timed trimmer control for gradual engagement of full capacity of a first drive established by a friction device. The controls include an operator control or fuel feed control to jointly control fuel feed and a neutral to first drive shift for initiating the drive. The control for initiating forward drive in a range of low fuel feed or throttle positions has a low capacity control increasing the drive capacity of the friction drive establishing device in a low capacity range from less to slightly more than required to establish drive at the low power developed in the range of low fuel feed positions which may be engine idle power, idle and a small increase of power or especially idle and a small increase of power in a terminal portion of said range of throttle positions. At the maximum engine power provided in the low fuel feed, the control effects a transition, disabling the low capacity control, and activating a high capacity control for use in the high fuel feed range, a timed trimmer control, increasing in a short predetermined time period, the drive capacity of the drive establishing device in a high capacity range from a low value insufficient to engage high power drive to a high value for smooth high to full capacity engagement and drive. The highest capacity in the low capacity range is about equal and preferably slightly higher than the lowest capacity in the high capacity range so there is some capacity overlap of these ranges for smooth shifting during a transition between these ranges. The highest engine power developed in the low fuel feed range and speeds above the low range power drive speed disable low capacity range control to effect this transition. The low capacity control increases capacity proportional to throttle position. Slow throttle movement in the low fuel feed range may be varied to provide slipping creep first drives or a slipping smooth full engagement of first drive to get a standing or slowing moving vehicle under way at low engine torque and power, and rapid throttle movement through the low fuel feed range to the high fuel feed range voids low capacity control operation and provides high capacity control operation.

The fuel feed and transmission pressure control has a full range of transmission pressure control movement having an initial low capacity and low fuel feed range providing low fuel feed and from an off position providing minimum low range pressure insufficient to engage low capacity first drive and on movement through the low range of transmission pressure control movement gradually increases the transmission ratio establishing control pressure through a low pressure range to a maximum low range pressure as a function of the distance moved for engaging low capacity first drive at a pressure in said low pressure range providing sufficient capacity for non slip drive at the low engine power at the low fuel feed. The fuel and pressure control has thereafter a high capacity and high fuel feed range of movement providing a high range of fuel feed from a low value to a high value and thus a high power range providing maximum or main line ratio establishing pressure with a trimmer control operative on the initial supply of fluid to reduce the ratio establishing control pressure to a minimum value in a high pressure range insufficient to engage first drive in the high power range, to gradually increase the control pressure to the maximum value in said high pressure range in a short predetermined time period for smoothly engaging non slip first drive at a high pressure in said high pressure range at a high power and then increasing engaging pressure to said maximum ratio establishing pressure. The low fuel feed or throttle opening may be idle or vary from idle to near idle position preferably being at idle during a large part of said low fuel feed range and increasing from idle to a near idle part throttle position in another large part of said low fuel feed range. The high fuel feed range is from near idle to full fuel feed or throttle. The maximum low range pressure is about the same as or preferably slightly higher than the minimum high range pressure so there is overlap and a smooth transition between the low capacity range and high capacity range shifting. The operator, by slowly moving the fuel and pressure control from off position through the low range positions, proportionately increases capacity for low capacity first drive engagement. Varying the rate of slow movement of this control similarly varies the rate of capacity increase, engagement, or amount of slip before non slip drive. The operator may hold this control in various slipping drive positions for selected creep speed drives at low power. The operator may quickly move this control through the low capacity range, voiding its operation by providing a rate of capacity increase as great as the timed trimmer control, to the high capacity range providing first drive engagement at a predetermined timed rate of increase of capacity and pressure. If this control is moved slowly through low pressure and capacity range, the trimmer operates sufficiently fast so the initial low pressure in the high pressure range will be the same as the last high pressure in the overlap of the ranges.

As this low capacity first drive engagement has a longer engagement period than is desired at higher torque and power levels, an overcontrol responsive to the highest torque demand, torque or power in the low fuel feed range terminates low pressure range control by deactivating the pressure reducing regulating function of a regulator and connects maximum pressure for high pressure range trimmer control of engagement of first drive. A compressor discharge pressure overcontrol signal is preferred as it is more directly responsive to engine torque and power than fuel feed control. To provide engine braking at low vehicle speeds, an output governor at moderate and higher speeds, or a speed above the maximum first drive speed in the low fuel feed range voids the low pressure range, by similarly deactivating the regulator and engaging first drive regardless of throttle pedal position. Since full pressure engagement is suitable for establishing reverse drive, reverse pressure similarly deactivates the regulator.

When the transmission manual control is in neutral and the throttle control is in the off position, the control system disengages all of the friction drive establishing devices of the planetary gearing for a positive neutral. When a manual selector valve is shifted from neutral to forward drive, a shift signal pressure engages the forward clutch and the first second drive relay valve continues to supply a first drive feed pressure to a neutral first shift regulator valve as in neutral. With the fuel and pressure control member in an off position providing idling fuel feed, there is a positive neutral since the regulator provides insufficient pressure for any driving engagement. Movement of this control in a low pressure and fuel feed range gradually increases engagement pressure in a low pressure range for slipping engagement and gradually increasing torque capacity of first drive to a low pressure providing full engagement, a non slip drive, at the low power provided by the low fuel feed.

An overcontrol valve, in response to speeds above low power range first speed, compressor discharge pressure at highest low power range and reverse drive, prevents low pressure range regulation by the regulator valve and provides maximum pressure to the trimmed engagement system.

These and other features of the present invention will be more apparent from the following description and drawings of the preferred embodiment in which:

FIG. 1 is a block diagram showing the arrangement of FIGS. 2, 3, 4, 5 and 6; and FIGS. 2, 3, 4, 5 and 6 when arranged according to FIG. 1 schematically show the transmission gearing and controls.

FIG. 7 shows the operation curve of the N-1 shift regulator valve.

FIG. 8 shows the operation curve of the first drive trimmer valve.

Figure 3:
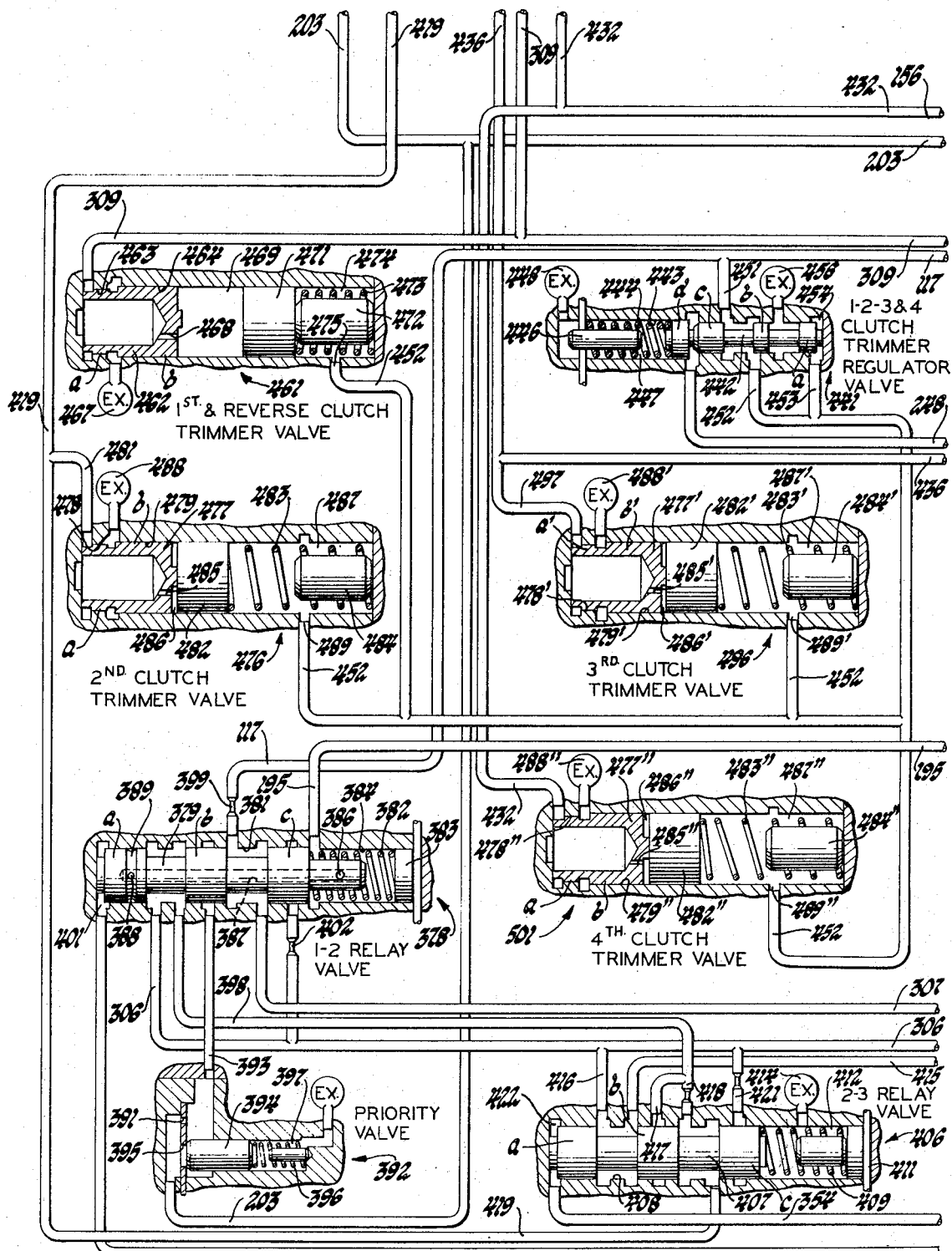

Referring to the drawing, FIG. 2 shows a gas turbine engine 8 having a compressor discharge pressure signal line 9 providing a torque demand signal and a fuel feed control controlled by throttle rod 504 drives input shaft 22. This engine is preferably a two spool engine having compressor discharge line 9 shown in the Flanigan et al. U.S. Pat. No. 3,237,404 granted Mar. 1, 1966, incorporated herein by reference.

The four speed gear unit generally designated 34 has three planetary gear sets to provide four forward speed drives and a reverse drive which are hereinafter referred to as first to fourth and reverse. The first gear set of the four speed unit 34 has planetary pinions 36 mounted on a carrier 37 and meshing with sun gear 38 and ring gear 39, the second gearset having pinions 41 rotatably mounted on carrier 42 and meshing with sun gear 43 and ring gear 44 and the third gearset having planetary pinions 46 mounted on the carrier 47 and meshing with sun gear 48 and ring gear 49.

A forward clutch 51 is engaged in all forward ratios and connects shaft 22 to imtermediate or primary gear input shaft 53 to provide a drive to the sun gear 38 of the first gear set and through hub 54 the ring gear 44 of the second gear set. The forward clutch 51 has plates 55 mounted on a drum 56 driven by the rotary hub 57 drive connected to shaft 22. The hub 57 has a cylinder 58 formed therein for piston 59. On the supply of fluid by forward drive or forward clutch apply line 203 to the cylinder 58, the piston 59 engages the plates 55 and the plates 61 which are connected by a hub 62 to the intermediate shaft 53. Fourth speed clutch 63 connects to the secondary gear input shaft 64 which drives the sun gears 43 and 48 of the second and third gear sets and cooperates with clutch 51 to lock all transmission units for 1:1 drive to the output 99. The fourth speed clutch 63 has an input drum 66 formed as a continuation of drum 56 to drive input plates 67. The output plates 68 are connected by drum 69 and hub 71 to input shaft 64. The hub 71 has a cylinder 72 formed therein for the piston 73 and on the supply of fluid to the cylinder by fourth clutch apply line 432, piston 73 engages the plates to effect a drive from the shaft 22 to the secondary input shaft 64 to drive sun gears 43 and 48. The shaft 64 may also be held by the third speed brake 76 which has fixed plates 77 and rotary plates 78 drive connected through drum 69 and hub 71 to shaft 64 to hold shaft 64 and sun gears 43 and 48. When fluid is supplied by third apply line 436 to the cylinder 79 formed in housing 19 to move the piston 81 to apply plates 77, 78, the brake 76 is engaged to hold the shaft 64 and the sun gears 43 and 48. The second speed brake 82 has a plurality of fixed plates 83 fixed to the housing 19 and rotary plates 84 connected by a hub 85 to the carrier 47 of the third gear set. When fluid is supplied by second apply line 419 to the cylinder 86 formed in housing 19, piston 87 moves to engage the plates 83, 84 and holds the carrier 47. The first and reverse brake 89 has a plurality of fixed plates 91 secured to housing 19 and rotary plates 92 drive connected to ring gear 39. When fluid is supplied by first speed brake apply line 309 to the cylinder 93 formed in housing 19 to move the piston 94 and engage plates 91, 92, the ring gear 39 of the first gear set is held.

CONTROLS

The brakes and clutches are engaged as indicated by X on the following chart and the others disengaged to provide four forward speeds and reverse.

| Drives | Brakes | | | | Clutches |
|---|---|---|---|---|---|
| | 1st & Rev. | 2nd | 3rd | 4th & Rev. | Forward |
| | 89 | 82 | 76 | 63 | 51 |
| R | X | | | X | |
| 1 | X | | | | X |
| 2 | | X | | | X |
| 3 | | | X | | X |
| 4 | | | | X | X |

FLUID SUPPLY

Referring to FIG. 6, the fluid exhausted from the control and lubrication system collects in the sump 111 in the lower portion of the transmission housing. A gear pump 112 draws fluid through the suction line 116 and delivers fluid through filter 118 to the main line 117. The main pressure regulator valve 119 regulates the pressure in main line 117 and has a valve element 121 having lands $a$, $b$, $c$, $d$ of equal diameter and a larger land $e$ located in a stepped bore 122. The valve element 121 is biased to the closed position shown by a spring 123 mounted on a combined spring seat and stop element 124 which is a tubular member to limit valve movement and spring compression which has a flared end 125 providing a seat for the spring and abutting snap ring 126 to retain the seat element and spring in spring chamber 127 vented to exhaust 128. The main line 117 has a branch 130 connected between the lands c and d through port 131 and passage 132 through the valve from the groove between lands c and d to the groove between the lands a and b and through a damping restriction 133 between land a and the bore at the end of the valve element to provide hydraulic bias in closed chamber 134 opposing the spring to regulate the main line pressure at a predetermined valve. Regulated pressure is supplied by passage 132 to the space between the lands a and b to prevent leakage from chamber 134 to the space between lands b and c vented by exhaust 135. Such leakage would be supplied through restriction 133 and modify regulation. The forward knockdown pressure line 137 is connected at the step between lands d and e to reduce the regulated pressure to i.e. 150 psi in all forward drive positions while pressure in reverse drive is higher, i.e. 250 psi. Excess main line pressure in line 117 and chamber 134 moves the regulator valve element 121 to the exhaust position exhausting branch 130 to overage line 136 and cooler 160. The cooler outlet line 154 is connected to the lubrication lube regulator valve 139, a conventional relief valve which is closed when the overage pressure does not exceed a low value to first supply lubrication line 138. When the lubrication pressure is sufficient, and exceeds a predetermined value, i.e. 40 psi, the valve 139 opens to connect cooler outlet line 154 to exhaust 141.

DETENT VALVE

Figure 5:
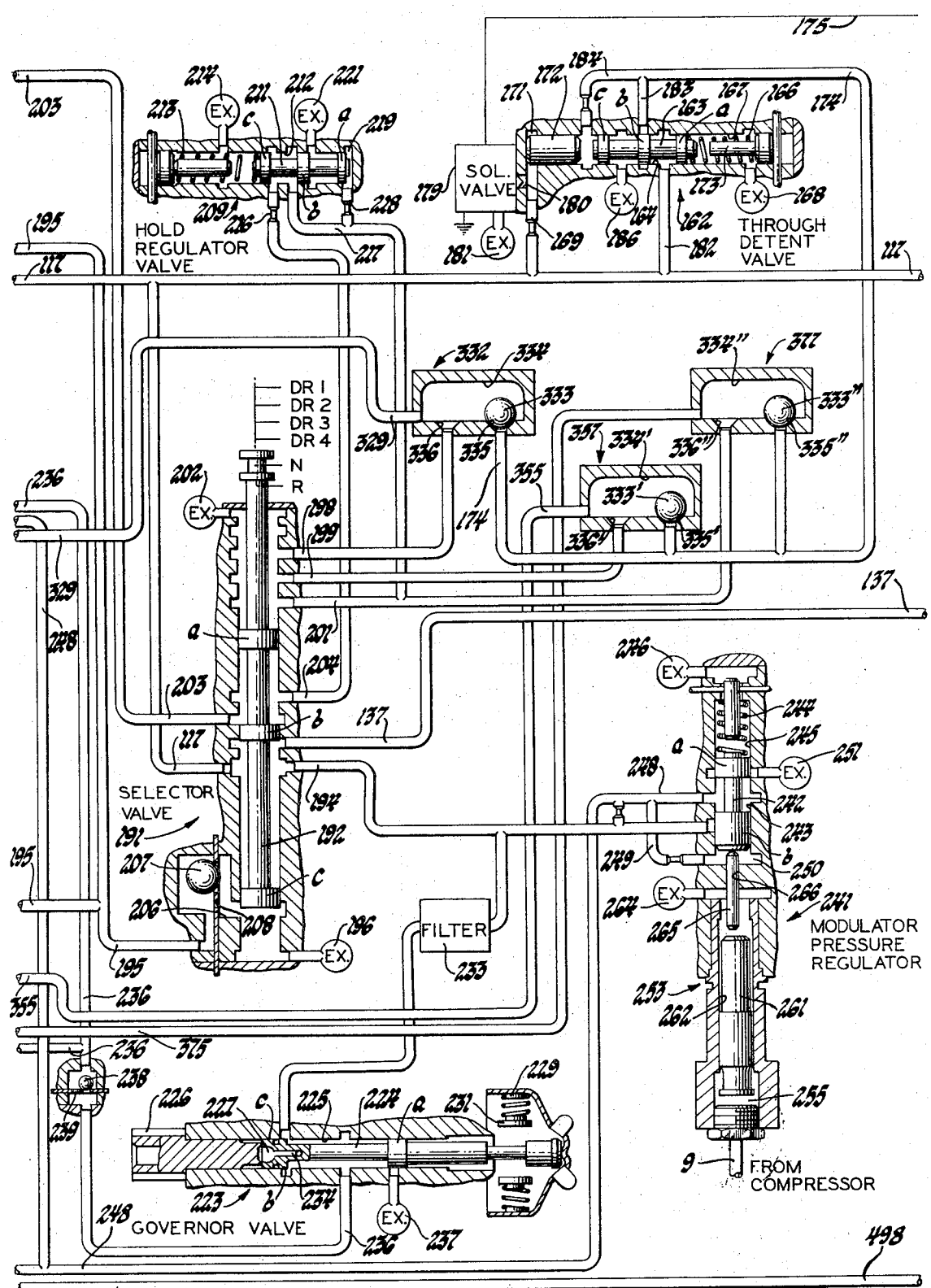

A through detent valve 162, FIG. 5, which has a valve element 163 having equal diameter lands a, b and c located in a bore 164 and is biased in an opening direction by a spring 166 located in the spring chamber 167 vented by exhaust 168. Main line 117 is connected through restricted passage 169 to a chamber 171 to act on the inactivating piston 172 to normally engage valve element 163 and hold it in the extreme right position against the stop element 173 so that the through detent valve does not deliver pressure to the detent line 174. When the throttle pedal 176, FIG. 6, is past the full throttle position, it closes switch 177 connecting a grounded power source 178 by conductor 175 to the solenoid valve 179 which opens the port 180 to exhaust 181 to vent fluid in chamber 171 to permit the detent valve 162 to regulate pressure. The regulated pressure supplied from main line 117 via branch 182 to the space between lands a and b to the branch 183 of detent line 174 and through restricted branch 184 to the space between the piston 172 and valve element 163 to initiate regulation of detent line pressure at a predetermined low value, i.e. 38 psi, determined by spring 166. Excess pressure will move the valve element 163 against the spring 166 and connect the detent line to exhaust 186.

SELECTOR VALVE

The manual selector valve 191 has a valve element 192 having equal diameter lands a, b and c. In all valve positions, main line 117 is connected to the signal feed line 194. In neutral the main line is also connected to the forward knockdown line 137. The reverse selector line 195 is connected to exhaust 196. The drive one line 198, drive two line 199 and the drive three line 201 are connected to exhaust 202. The drive four line 203 is connected via hold feed line 204, hold regulator valve 209, hold pressure line 217, drive three line 201 to exhaust 202.

On movement of the selector valve 192 to the reverse position, land c closes exhaust 196 and connects main line through port 206 and opened fast feed ball check valve 207 and slow return restriction 208 to the reverse selector line 195. The forward knockdown line 137 is also exhausted via hold feed line 204. On movement of the selector valve to drive four position, DR4, reverse is exhausted and in addition to feeding feed line 194 and forward knockdown line 137 as in neutral, the drive four line 203 is fed while the other drive lines remain connected to exhaust as in neutral. In drive three position, DR3, the main line 117 additionally feeds the hold feed line 204 and blocks the exhaust of drive three feed line 201. In drive two position, DR2, the main line feeds the same lines and interconnects drive two feed line 199 and drive three feed line 201. In drive one position, DR1, the main line feeds the same lines and the drive one feed line 198, drive two feed line 199 and drive three feed line 201 are interconnected.

HOLD REGULATOR VALVE

The hold regulator valve 209 regulates the pressure distributed by the drive one, two and three feed lines and has a valve element 211 having equal lands a, b and c located in a bore 212. A spring 213 located in a spring chamber vented by exhaust 214 biases the valve 211 to the open position shown. In the open position shown, the hold feed line 204 is connected through restriction 216 to the space between lands b and c and supplies hold pressure supply line 217 which is connected to the drive three line 201. This hold pressure supply line 217 is also connected by restriction passage 218 to the closed chamber 219 at the end of bore 212 to act on land a of the valve element to oppose the spring bias. The pressure in chamber 219 moves the valve against the spring to connect line 217 to exhaust 221 or feed line 204 to regulate hold pressure at a valve intermediate main line pressure and detent pressure, i.e. 45 psi.

GOVERNOR

The governor valve 223 has a valve element 224 having equal lands a, b and c mounted in a bore 225 and is rotatably driven by a gear 226 driven from output shaft 99 by a spline connector 227 which permits axial movement of the valve element 224 under the influence of the rotating governor weights 229 and secondary weights 231 which provide a stepped pressure varying with output or vehicle speed. Fluid pressure supplied by the signal feed line 194 through filter 233 is connected between lands a and b and by a passage 234 through the valve element to the end valve element 224 to act on the end of the valve element to move it to an exhausting position connecting governor signal line 236 to exhaust 237 against the opposing force of the governor weight. The force of the governor weight overcomes the pressure to move the valve to the left connecting signal feed line 194 to governor line 236 and closing exhaust 237. The one way check valve 238 permits fast flow of the governor signal pressure to the shift valves and the return restriction 239 only permits slow return flow so the governor pressure line has fluid flow to supply without pressure drop, the expanding governor pressure chambers when shift valves upshift

MODULATOR PRESSURE REGULATOR

The modulator pressure regulator 241, FIG. 5, provides a pressure inversely proportional to torque demand and has a valve element 242 having equal lands *a* and *b* mounted in a bore 243. The spring 244 located in a spring chamber 245 vented by exhaust 246 biases the valve element to the open position connecting signal feed line 194 between the lands to the modulated signal line 248 which is connected by a restrictive passage 249 to the chamber 250 at the end of the bore 243 to act on the end of land *b* to bias the valve element to connect modulator line 248 between lands *a* and *b* to exhaust 251, to regulate the modulated signal pressure inversely proportional to engine load or the force delivered by compressor discharge actuator 253.

The modulator pressure regulator valve 241 is controlled by an actuator 253 consisting of an actuator stem 261 which is reciprocally mounted in a bore 262 in the end wall of the valve body which is vented by exhaust 264. A chamber 255 is adjacent the end of stem 261 and is connected by compressor discharge pressure line 9 to the compressor of the gas turbine to permit compressor discharge pressure, which is a function of engine power developed and throttle position and thus a function of torque and torque demand, to act on the stem 261. The stem 261 engages a pin 265 reciprocally mounted in a bore 266 in the valve body to engage the valve element 242. The force of the actuator stem 261 is proportional to the compressor discharge and thus increases with increasing compressor discharge pressure and acts through the stem 261 and pin 265 on the valve element 242 and with the regulated pressure in opposition to the valve spring 244 to provide a regulated pressure inversely proportional to actuator force, or compressor discharge pressure as explained in detail in the Robert H. Schaefer U.S. Pat. No. 3,587,355 patented June 28, 1971 incorporated herein by reference.

NEUTRAL-ONE SHIFT REGULATOR OVERCONTROL VALVE

Figure 4:
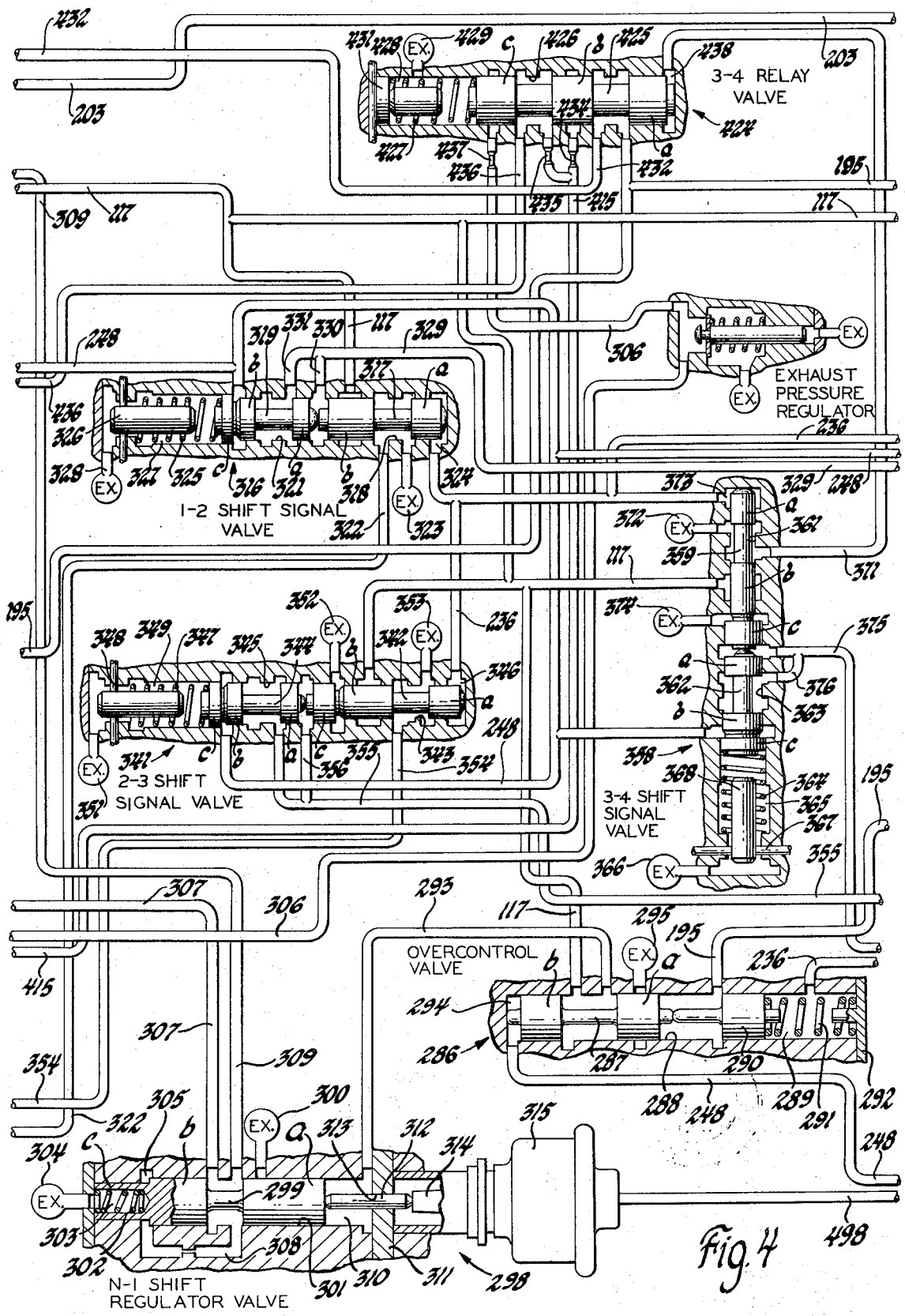

The neutral-one shift regulator overcontrol valve 286, FIG. 4, overcontrols the neutral-first shift regulator valve 298 which regulates the apply pressure on low speed and low throttle neutral to first shifts for controlling the rate of engagement of the first brake 89. The overcontrol valve 286 has a valve element 287 having equal diameter lands a and b slidably mounted in a bore 288 and a plug 290 slidably mounted in bore 288. The plug 290 and valve 287 are biased by governor pressure from line 236 connected to chamber 289 at the closed end of bore 288 and by spring 291 seated on the closure 292 at the end of the bore and both acting on the plug 290 or by reverse pressure in line 195 always connected to the space between valve element 287 and plug 290 to act on land a of valve element 287 to move or bias the valve element to the open position connecting main line 117 to overcontrol line 293 connected to regulator valve 298 to prevent first apply pressure reducing regulation. Inverted modulator pressure line 248 is connected to chamber 294 at the closed end of bore 288, opposite closed fluid and spring chamber 289, and acts on the end of land b of valve element 287 to bias the valve against spring and governor pressure to close the overcontrol valve blocking main line 117 and connecting overcontrol line 293 to exhaust 295. In a low throttle range, from idle to a near idle position, i.e. idle, called zero percent, to 5 percent of full throttle, at zero speed and governor pressure and in forward drive, high inverted modulator pressure in chamber 294 overcomes spring 291 to close the overcontrol valve and exhaust overcontrol line 293 to permit regulator valve 298 to provide a reduced regulated pressure in a low pressure range. Governor pressure in chamber 289 from zero to a low speed valve will reduce the throttle range in which regulator valve 298 regulates. At a low transition speed just above the speed of the vehicle in fully engaged first drive in the low throttle range, governor pressure prevents pressure regulation at any throttle setting including idle. The reverse pressure from line 195 opens the overcontrol valve regardless of throttle position and governor pressure to disable regulator valve 298.

NEUTRAL-ONE SHIFT REGULATOR VALVE

The neutral-one shift regulator valve 298, FIG. 4, has a valve element 299 having equal diameter lands *a*, *b* and smaller land *c* mounted in a stepped bore 301 and biased to connect first brake line 309 to exhaust 300 for reducing pressure by the spring 302 mounted in a spring chamber 303 vented by exhaust 304 and by regulated first apply pressure in the stepped port 305 acting on the unbalanced area between lands *b* and *c*. The first apply feed line 307 from the one-two relay valve 378 is connected to bore 301 between lands *a* and *b* of valve element 299 to first brake apply line 309 in the pressure increasing position of the valve shown. First brake line 309 has a restricted branch 308 connected to stepped port 305. Thus, regulator valve 298 is a downstream regulator valve which, when pressure is supplied by first feed line 307, will provide a reduced pressure in first apply line 309 proportional to the force transmitted by pin 312. Overcontrol line 293 is connected to chamber 310 at the end of bore 301 closed by wall 311 to act on land *a*. Overcontrol pressure prevents pressure reducing regulation by disabling regulator valve 298 so it connects main line pressure in first feed line 307 to first apply line 309 without regulation. A pin 312 reciprocally mounted in a bore 313 in wall 311 transmits force from force plunger 314 of a diaphragm receiving unit 315 actuated by sending unit 497. The throttle pedal 176 on moving through a low throttle range from an off position O to a near idle low throttle position, as explained below, actuates sending unit 497, FIG. 6, and through connecting line 498 actuates the receiving unit 315 and regulator valve 298.

These sending and receiving units are constructed according to U.S. Pat. No. 3,577,806, Robert H. Schaefer patented May 4, 1971 incorporated herein by reference. In the low pressure range of regulating operation permitted by the absence of overcontrol pressure, during forward drive in a low throttle range, reduced with increasing speed and voided at a low transition speed, i.e. 5 or 6 mph, the force transmitted by the sending and receiving units to the regulator valve 298 increases as a function of low range throttle pedal movement from the off position to the near idle throttle position to increase the regulated first apply pressure in a low pressure range from zero pressure in the off position O to maximum low range pressure in the near idle (NI) throttle position as shown in FIG. 7 by the sloped portion a of pressure curve b for neutral first regulator valve 298. At the near idle position regulation by regulator valve 298 is terminated by overcontrol pressure and the pressure rises, curve c, to maximum or main line pressure curve d. To insure increasing low range pressure, curve a, to torque termination at curve c, the system has the capability to further increase low range pressure by a tolerance compensation value. The maximum low range pressure provides full or non slip first drive in the low engine power range in low throttle range. As low range regulated pressure rises along curve a, a slipping drive is established as it approaches non slip drive pressure, which varies with the torque required to move the load at the drive speed, i.e. 40 psi, curve e, and a non slip drive is established when it equals non slip drive pressure, point f.

Governor pressure voids the pressure reducing regulation at a low transition speed, 5 or 6 mph, a speed just above the low speed in fully engaged first drive at near idle, the maximum in low throttle range, to, in low throttle range, provide the manually controlled neutral to first shift and prevent a shift to neutral at low speeds where engine braking is desired during coasting. The inverted modulator pressure acts on the overcontrol valve to disable the regulator valve so a neutral to first shift can be made even though the regulator system is not functioning. Whenever regulator valve 298 is regulating in the low pressure range a and is disabled by the overcontrol pressure, the pressure rises to main line pressure, FIG. 7, dotted curve f.

ONE-TWO SHIFT SIGNAL VALVE

Automatic shifting between first to fourth speed forward drives is provided by a speed and engine load signal controlled shift signal valve, one for each speed change, each having an associated relay valve. The shift and relay valves for each speed change are similar but are individually described with the connections and then the basic function of operation is discussed.

The one-two shift signal valve 316, FIG. 4, has a valve element 317 having land a and larger land b in a stepped bore 318 and a control element 319 having lands a, b and c of increasing diameter from a to c mounted in a stepped bore 321. The land b of valve element 317 is larger than land a so that when the valve is moved from the downshift position shown in FIG. 4 to the upshift position connecting main line 117 to the one-two signal line 322 for a shift to second speed, there is an added hysteresis force in an upshift direction on the valve. In the downshift position shown, the one-two signal line 322 is connected to exhaust 323 and this hysteresis force is dropped. In both downshift and upshift positions, governor pressure from line 236 enters chamber 324 at the end of bore 318 and acts on land a of valve element 317 in an upshift direction. Also modulator pressure line 248 is connected to the stepped bore between the large land c and the smaller land b of control element 319 to also provide an upshift direction force. Both the governor and modulator upshift direction forces are opposed by the downshift direction force of spring 325 which is mounted on a suitable spring seat and stop assembly 326 in a spring chamber 327 vented by exhaust 328. When governor pressure and modulator forces overcome the spring force, both valve elements upshift and the modulator pressure from line 248 is also connected between land a and b of the control valve element 319. Since land b is larger than the land a there is an additional area and upshift force after upshifting to control the downshift. The two-one downshift line 329 may supply either hold pressure from the drive one line 198 or detent pressure from detent line 174 and is connected via branch 330 to hold the shift valve element 317 in the downshift position when downshifted or via branch 331 when the valve element is upshifted to downshift the shift valve element at a predetermined speed. The regulated hold pressure supplied is insufficient to downshift above a predetermined speed for a proper shift.

The two-one downshift line 329 is supplied in a detent position of the throttle pedal by detent valve 162 and detent line 174. If the slightly higher hold pressure from hold regulator valve 209 is connected by the selector valve 191 in the drive one position to drive one line 198, the one-two shuttle valve 332 blocks detent line 174 and connects hold pressure from drive one line 198 to downshift line 329. The shuttle valve 332 has a ball 333 located in a chamber 334 having a bottom surface having depressed seat port 335 at the entry of detent line 174 to the chamber and closely adjacent depressed seat port 336 at the entry of drive one line 198. The downshift line 329 is connected to chamber 334 by a port that is wide and positioned so it cannot be blocked by ball 333. When pressure is supplied to one of seat ports 335 or 336, the ball will seat in and close the other. The chamber has a rounded upper surface particularly at the ends to guide the ball into the seat ports and the height of the chamber between the seat ports should be only slightly greater than the ball diameter.

TWO-THREE SHIFT SIGNAL VALVE

The two-three shift signal valve 341 has a valve element 342 having lands a, b and c of increasing diameter from a to c in a stepped bore 343 and a control element 344 having lands a, b and c of increasing diameter from a to c in a stepped bore 345. In both the up and down shift positions of the shift valve, the governor pressure line 236 is connected to the chamber 346 to provide an upshift direction force and the modulator pressure line 248 is connected between the lands b and c of control element 344 to act on the excess area of land c to provide an upshift force against the downshift direction force of spring 347 mounted on a seat assembly 348 in the spring chamber 349 which is vented by exhaust 351. Exhaust 352 vents a space between lands b and c of valve element 342. Exhaust 353 exhausts the two-three signal line 354 with the valve element 342 in the downshift position shown so there is no two-three signal pressure for a shift to third. On an upshift exhaust 353 is closed and main line 117 is connected to the two-three signal line 354. With the shift valve 342 and control valve 344 in the downshift position shown or upshift position, governor pressure from line 236 in chamber 346 acting on land a and modulator pressure from line 248 acting on land c of control valve 342 provides an upshift direction force against the downshift force of spring 347 to provide upshifts. When the governor pressure and modulator pressure overcome the spring force, the shift valve 342 and control valve 344 move to the upshift position. The main line pressure acting on land b which is larger than land a provides an upshift hysteresis force and modulator pressure acting on land b provide an added upshift force to provide downshifts at speeds lower than upshift speeds. The three-two downshift line 355 in the downshift position of the shift valve and the branch 356 in upshift position of the shift valve is connected to the valve bore between the shift valve element 342 and the control valve element 344, for downshifting the shift valve element when supplied with hold or detent pressure. The detent pressure line 174 and the hold pressure via drive two line 199 are connected to the two-three shift shuttle valve 357 which is like the one-two shuttle valve 332 and has the same reference numbers primed. When the throttle pedal is in detent position providing detent pressure in line 174 shuttle valve 357 connects this pressure to the three-two downshift line 355 but if the selector valve 191 is in drive two or one positions providing hold pressure in line 199 this higher pressure is supplied to downshift line 355 and detent pressure blocked.

THE THREE-FOUR SHIFT SIGNAL VALVE

The three-four shift signal valve 358, FIG. 4, has a shift valve element 359 having lands a, b and c located in a stepped bore 361 and a control valve element 362 having lands a, b and c in a stepped bore 363. The lands of both valve elements have sequentially increasing diameters from a to c. Both valve elements are biased to the downshift position by a spring 364 located in a spring chamber 365 vented by exhaust 366. The spring is seated on an adjustable seat 367 and having a stop pin 368 limiting valve movement. In the downshift position, shift valve element 359 blocks main line 117 and connects the three-four shift signal line 371 to exhaust 372. In this position governor pressure acting in chamber 373 on the land a of valve element 359 and modulator pressure line 248 acting on the land c of control valve element 362 provide a force in the upshift direction against the downshift direction force of the spring 364. When governor and modulator pressure overcome the spring force, the valve elements upshift. In upshift position land a of valve element 359 blocks exhaust 372, main line 117 is connected to the three-four shift signal line 371 and the main line pressure between lands a and b acts on the larger area of land b to provide a primary additional upshift hysteresis force. In addition, modulator pressure also acts on land b of control valve element 362 to provide an additional upshift force causing downshifts at lower speeds. The exhaust 374 vents the valve bore between the downshift line 375 and main line 117. Hold or detent pressure in three-four downshift line 375 and its branch 376 is connected between the valve elements when in the downshift and upshift position respectively to position valve element 359 in a downshift position at proper speeds. When detent pressure is supplied to line 174 the three-four shuttle valve 377 connects it to four-three downshift line 375 unless the selector valve is in drive one, two or three position and supplies the higher hold pressure to drive three line 201 which is then connected to downshift line 375 and detent pressure is blocked. This shuttle valve 377 is like shuttle valve 332 and has the same reference numerals double primed.

ONE-TWO RELAY VALVE

The one-two relay valve 378, FIG. 3, has a valve element 379 having equal diameter lands a, b and c located in a bore 381 and is biased to the first speed position shown by a spring 382 seated on the spring seat 383 located in a closed chamber 384. The chamber 384 is connected by a port 386 and a passage 387 through the valve element to a port 388 located in a groove 389 in the land a to exhaust the chamber in the upshift position. Main line pressure supplied from the selector valve 191 to the drive four line 203 is always connected through restriction 391 in the priority valve 392 to the priority main line 393. The priority valve has arranged in parallel with restriction 391 a relief valve having a valve element 394, closing port 395 under the bias of spring 396 in vented chamber 397 when the pressure in main line and drive four line 203 is insufficient for properly operating the transmission and open when the pressure is sufficient. The valve will close momentarily during shifts involving engagement of second, third and fourth in forward drives to maintain sufficient main line feed pressure to the modulator valve 253 and governor valve 223. The restriction 391 provides an exhaust connection in neutral position of the selector valve.

Relay valve 378 in the first speed position shown, connects the one-two shift line 398 to exhaust line 306, blocks priority drive four line 393, connects the main line 117 via restriction 399 between the lands b and c to the first feed line 307, blocks restricted branch 402 of exhaust line 306 at the land c and connects reverse drive line 195 from the manual selector valve adjacent land c to the spring chamber 384 which is closed since passage 387 is blocked. When the one-two shift signal valve 316 provides pressure in the one-two signal line 322 to supply fluid to the closed chamber 401, valve element 379 is moved against the bias of the spring except in reverse to the second speed position. Then spring chamber 384 is connected via passage 387 to exhaust line 306, priority drive four line 393 is connected to the one-two shift line 398, main line 117 is blocked by land b, the line 307 is connected via restricted branch 402 to exhaust line 306 and reverse line 195 is blocked by land c.

TWO-THREE RELAY VALVE

The two-three relay valve 406 has a valve element 407 having equal diameter lands a, b and c located in a bore 408 and biased by a spring 409 to the downshift or second speed position shown in FIG. 3. The spring is seated on a seat and pin assembly 411 in a chamber 412 vented by exhaust 414. When the relay valve is biased by the spring to the second speed position, the two-three shift feed line 415 is connected between lands a and b via branch 416 to exhaust line 306, one-two shift line 398 has unrestricted branch 417 blocked by land b and the restricted branch 418 connected between lands b and c to the second brake line 419 and restricted branch 421 of the exhaust line 306 is blocked by land c. When the two-three shift signal valve 341 supplies the two-three shift signal line 354 pressure to chamber 422, the two-three relay valve element moves against the spring 409 to the stop pin and exhaust branch 416 is blocked by land a, the one-two shift line 398 via branch 417 is connected to the two-three shift line 415, the restricted branch 418 is blocked by land b and the second brake line 419 is connected via restricted branch 421 to exhaust line 306.

THREE-FOUR RELAY VALVE

The three-four relay valve 424 has a valve element 425 having equal diameter lands a, b and c located in a bore 426 and is biased by a spring 427 to the third position shown in FIG. 4. The spring is located in the chamber 428 vented by exhaust 429 and seated on a seat and valve stop assembly 431. When the valve element 425 is biased to the third position shown by the spring 427, reverse drive line 195, an exhaust, is connected between the lands a and b to the fourth clutch lines 432, the two-three shift line 415 has restricted branch 434 blocked by the land b and restricted branch 435 connected between lands b and c to the third brake line 436 and the exhaust line 306 connected by restriction 437 is blocked by land c. When the three-four shift signal valve 358 provides a signal pressure in the three-four shift signal line 371 to the chamber 438, this pressure acts on land a moving the valve to the fourth speed position. Then reverse drive line 195 is blocked by land a, two-three shift line 415 is connected by restrictive branch 434 to the fourth clutch line 432 and branch 435 is blocked by land b and the third brake line 436 is connected via restriction 437 to exhaust line 306.

TRIMMER REGULATOR VALVE

The trimmer regulator valve 441, FIG. 3, has a valve element 442 having equal diameter lands a, b, c and larger land d located in a stepped bore 443 and is biased to the feed position shown by a spring 444 seated on an abutment and stop pin assembly 446 located in a spring chamber 447 vented by exhaust 448. With the valve element 442 in the feed position shown, main line 117 branch 451 is connected between the lands b and c to the trimmer regulating pressure line 452 which is connected by branch 453 which may be restricted to the closed chamber 454 to act on the end of land a and oppose the spring bias and regulate the pressure. When the trimmer regulating pressure exceeds the regulated value, it will move the valve element 442 to the left connecting trimmer regulator pressure line 452 between lands a and b to exhaust 456. The modulator pressure line 248 is connected between the lands c and d to act on the unbalanced area of land d opposing the spring. Increasing modulator pressure provides a proportionately reduced trimmer regulating pressure. Since modulator pressure varies inversely with engine load and is a maximum at idle and reduces to zero at full throttle position, the trimmer regulator pressure is low at idle, low torque demand values, and increases proportionately to increasing torque demand to a high torque demand where the highest trimmer regulating pressure is determined by the spring force and the area of land a of trimmer regulator valve element 442.

TRIMMER VALVES

The first and reverse drive trimmer valve 461 has a trimmer regulator element 462 having a small land a and large land b located respectively in small bore 463 and large bore 464. The first brake apply line 309 is connected to the end of the bore 463 and acts on land a to bias the valve element to the right to the open position connecting first brake apply line 309 to exhaust 467 to reduce the pressure. First brake apply pressure from line 309 is also continuously connected through restriction 468 to the space 469 between the regulating valve element 462 and an actuator plug 471 which is shown seated on a stop member 472 fully compressing the spring 473 located in a closed chamber 474 having a trimmer regulator pressure connected thereto at a port 475 below the stop and thus never blocked by plug 471. When line 309 is vented, spring 473 is extended with plug 471 engaging and holding regulator valve element 462 in the closed position closing exhaust 467, the position in which second clutch trimmer valve 476 is shown. On the initial supply of fluid to the first brake by first brake apply line 309, pressure acts on land a of regulator valve element 462 moving valve element 462 to open exhaust 467 to and regulate at a low pressure value determined by the trimmer regulator pressure which increases with increasing torque demand and the minimum spring force at full spring height. At the same time fluid slowly flows through restriction 468 to fill and enlarge the space 469 to gradually separate the regulator valve element and plug so that the spring 474 is more and more compressed reducing the spring height to increase the spring force to gradually increase the regulated pressure through a range of high regulated pressures at a rate and in a short time period i.e. 1 to 3 seconds determined by the restriction and increasing force due to the spring rate until the maximum regulated pressure in the high regulated pressure range is provided for gradual full engagement of the friction device. The the valve element 462 moves from the regulating position to the closed high pressure position shown, quickly increasing first brake pressure to main line pressure. The valve will remain in this position until the first brake apply line 309 is exhausted, exhausitng space 469 through restriction 468 and grooves in the end of land a to line 309 so the plug 471 will return to its initial closed position. The pressure curves in FIG. 8 illustrate typical pressure values provided by trimmer regulator valve 461. The solid line curve for minimum torque demand shows the initial quick rise as fluid supplied to first brake line 309, an extended reduced slope portion showing the gradually increasing regulated pressure provided in a predetermined time period and thereafter a quick rise to main line pressure. The dotted portion shows the gradually increasing regulated pressure portion at full torque demand indicating that the regulated pressure may vary between these values as a function of torque demand.

The second speed trimmer valve 476 similarly has a regulator valve element 477 having small land a and large land b respectively located in small bore 478 and large bore 479. Second brake pressure in line 419 is connected by branch 481 to the end of bore 478 and acts on the land a to move the regulator valve 477 and the plug 482 against bias of spring 483 and the trimmer regulator pressure from line 452 and port 489 in chamber 487 to connect line 481 to exhaust 488 to reduce the pressure. The stop element 484 limits movement of the plug 482 and compression of the spring 483. When pressure is supplied via line 481 to the bore, it similarly flows through restriction 485 to the space 486 between the regulator valve and plug to gradually increase the regulated pressure like first and reverse trimmer valve 461.

The third speed trimmer valve 496 has the same construction and function as the second speed trimmer valve 461, so part numbers from the second speed trimmer valve have been primed and used to indicate like parts. This valve controls the third brake apply line 436 pressure which is connected by branch 497 to the end of bore 478'. The fourth clutch trimmer valve 501 is similar to the above trimmer valve and functions in the same way to regulate fourth clutch pressure in line 432 and thus the same reference numerals with double primes have been used.

THROTTLE CONTROLS

The throttle controls, FIG. 6, have a throttle pedal 176 mounted by pivot 491 on support 492 for movement from an off position O, to a closed throttle or idle position CT, a pre-throttle and pre-torque demand range, distance A. Thereafter, the pedal moves from closed throttle through a near idle NI, i.e. 5 percent power position to full throttle FT. The pedal movement from off position to near idle position covers a large distance B. The pedal is connected by pivot 493 to control rod assembly 494 connected by pivot 495 to input lever 496 of sending unit 497. The sending unit 497 is the sending unit 36 of the above U.S. Pat. No. 3,577,806 with input lever 34. This sending unit has motion limiting or stop means to limit movement of lever 496 at pivot 495 to distance B' equal to distance B and having a corresponding off position O' and near idle position NI'. The sending unit provides a pressure in line 498 in a low pressure range directly proportional to pedal movement from off to near idle pedal position, distance B, which, acting through the receiving unit, causes regulator valve 298 to regulate first supply pressure in a low pressure range, curve a, FIG. 7, directly proportional to throttle pedal movement from off to near idle position. In some drives or vehicles it may be suitable that the low throttle range merely be a low throttle phase, idle only, provided by making distances A and B equal from off to closed throttle. The rod assembly 494 input portion 506, has a lost motion slot 499 having a lost motion length and distance A' equal to A, the pedal travel distance from off to closed throttle. The throttle lever 501 is pivoted by pivot 502 on the support and has a pin 503 fixed on the lever at one end and extending into the slot and is connected at the other end to throttle control rod 504. The throttle pedal on movement A from off to closed throttle does not move the throttle rod so the fuel feed or throttle remains at idle but continued movement from closed throttle through near idle to full throttle moves the throttle rod and throttle from idle through near idle to full throttle. The slot 499 and pin 503 provide a lost motion device permitting initial lost motion so during off to closed throttle pedal movement the throttle stays at idle but continuously transmits this movement to sending unit 497, receiving unit 315 and neutral first regulator valve 298 to gradually increase pressure in a low pressure range, curve a, FIG. 7. The input rod portion 506 is connected to an output portion 507 by a lost motion device 508 transmitting initial movement and providing lost motion with continued movement. This lost motion device has a guide 509 having a slot 511. The rod portion 506 extends through an aperture 514 in the end wall of guide 509 and a head 516 is fixed on the end of rod portion 506 and slidable in slot 511 to permit limited relative movement or lost motion between the rod portions 506 and 507 for a distance permitting pedal movement from near idle NI to through detent position D. A spring 517 has one end engaging abutment 518 fixed to rod portion 506 and the other end engages the end wall of guide 509 to transmit initial pedal movement over distance B through rod portion 506 to rod portion 507, to cause lever 496 to move through distance B' until lever 496 abuts a stop limiting its movement. With continued pedal movement from near idle position to full throttle position, spring 517 compresses permitting lost motion between rod portions 506 and 507 so lever 496 remains in near idle position NI' as pedal 176 moves from near idle NI to full throttle position FT.

OPERATION

When the engine driving this transmission is running, the transmission input driven pump 112, FIG. 6, supplies fluid under pressure to the main line 117 which is regulated at a normal line pressure value, i.e. 150 psi when the transmission is in forward drive and forward drive knockdown pressure is supplied via line 137 to tthe regulator valve and at a higher reverse drive pressure i.e. 250 psi in reverse drive when this knockdown pressure is not supplied. The regulator valve exhaust line 136 is connected through cooler 160 and cooler out line 154 to lubrication regulator valve 139 and the lubrication line 138 to lubricate the transmission.

In neutral position, the manual selector valve 191 supplies fluid to the forward knockdown line 137 and the signal feed line 194 and the other lines, reverse 195, first 198, second 199 and third 201 drive lines are connected to exhausts 196 or 202 directly, while the drive four line 203 is connected to the hold feed line 204 and both are exhausted via the hold regulator valve 209 and the drive three feed line 201 to exhaust 202. As explained above, the trimmer regulator valve 441 supplied trimmer regulator pressure to line 452, the modulator pressure regulator valve 241 provides modulator pressure in line 248 inversely proportional to gasifier pressure, a torque demand and engine load signal and the transmission output governor valve 223 will provide a governor signal in line 236 that is a function of output speed. The hold pressure regulator valve is not supplied and thus there is no hold pressure in line 217 and there is no detent pressure in line 174.

Prior to starting the vehicle, the selector valve is in neutral position, the output or vehicle driven thereby will be stationary or nearly so and the engine running at idle with the throttle control pedal 176 at off position providing idle fuel feed and the control system is pressurized as pointed out above. The governor pressure is zero and modulator pressure is maximum, so the force provided by these is insufficient to overcome the downshift bias of the springs so the one-two, two-three and three-four shift signal valves 316, 341 and 358 are in the downshift position connecting the first speed apply one-two, two-three and three-four shift signal lines 322, 354 and 371 to exhaust 323, 353 and 372 respectively. The main line 117, which is directly connected to each shift signal valve, is blocked by land b thereof. Since there are no shift signal pressures, the one-two, two-three and three-four relay valves 378, 406 and 424 are spring biased to downshift or lower speed position. Since during engine idle in the pre-throttle range from off O to closed throttle CT, the inverted modulator pressure in line 248 has a maximum value and there is no pressure in governor line 230 or reverse line 195, overcontrol valve 286 exhausts overcontrol line 293 conditioning regulator valve 298 for operation. With throttle control 176 in the off position, no force will be transmitted by sending receiving units 497–315 to regulator valve 298 and first brake apply line 309 is connected to exhaust 300 disengaging the first brake 89. Thus no clutch or brake is engaged for a positive neutral.

If the output or vehicle is coasting at higher speeds, with the selector valve 191 inadvertently in neutral and the engine running, the automatic output governor and modulator pressure control system will function as during automatic shifting described below to position the shift signal valves and relay valves in accordance with speed and torque demand. At and above a low transition speed, 5 or 6 mph, governor pressure would open overcontrol valve 286 and supply overcontrol line 293 to disable regulator valve 298 connecting first feed line 307 to first brake line 309 engaging the first brake 89 but since the forward clutch 51 is disengaged, no drive is established. When the one-two relay valve 378 upshifts, first brake apply line 309 is connected by the neutral-one regulator valve 298 to the line 307 which is connected by the one-two relay valve 378 to exhaust 402 to disengage the first brake 89. Since drive four line 203 is exhausted at the selector valve in neutral position, the second and third brakes and fourth clutch cannot be applied. Thus on movement of the selector valve to a drive position, the forward clutch will be engaged and the priority valve 392 will supply fluid to then engage the drive speed selected by the automatic controls. The drive and coasting shift engagement sequence is the same, the drive always being completed by the first, second, third or fourth speed engagement device.

On shifting the manual selector valve 191 to the drive four position, DR4, at output speeds and engine load values insufficient to upshift the one-two shift signal valve 316, the main line 117 is directly connected to the drive four line 203 to supply fluid to engage forward clutch 51 and the main line 117 remains connected by the one-two relay valve 378 and first feed line 307 to neutral first regulator valve 298 for operator and automatic engagement control of first drive.

The overcontrol valve 286 automatically prevents operator control of the neutral first shift by neutral first shift valve 298 when it is proper to provide a timed trimmer valve shift. At low power range first drive speeds below 5 or 6 mph, low governor pressure in line 236 and spring 289 are overcome by high pressure in inverted modulator line 248 in the low power range, at engine idle to near idle, a signal of low torque output or demand based on low comprssor discharge pressure, closing overcontrol valve 286 to exhaust overcontrol line 293 to exhaust 295 to permit regulator valve 298 to regulate in the low pressure range. With the throttle pedal in the off position, the first feed line 307 is blocked and first apply line 309 is connected to exhaust to disengage the first brake 89 preventing engagement of first drive. Then as the operator slowly advances the throttle pedal in the low throttle range from off position 0 to near idle position NI, the sending and receiving units 497–315 transmit increased force to regulator valve 298 and increasing pressure varying as a function of throttle pedal position or distance moved is supplied to the first brake line 309 and first brake for an operator controlled low pressure range gradual engagement of first drive while the engine remains in the low power range from idle to near idle. The first brake is a fluid operated friction drive establishing device and drive torque capacity is a function of the apply pressure. Increasing apply pressure at a predetermined rate relative to pedal position, curve a, FIG. 7, similarly increases drive capacity to provide slip drive and then non slip drive, point $f$, as the capacity approaches and becomes equal to the required drive capacity, curve $e$, to move the load or vehicle. The operator may select to move the throttle pedal slowly in varying degree to gradually and slowly increase the first apply pressure at any rate relative to time less than the predetermined timed trimmer valve rate of increase for a smooth slower engagement. He may hold the pedal at an intermediate position in low throttle range providing a slipping or creep drive at a speed less than first ratio drive speed.

During such throttle pedal controlled slow gradual increase of the pressure in first apply line 309 as regulated by the neutral first regulator valve 298, the trimmer valve 461 acts as a follower valve to maintain the pressure regulated by the neutral first regulator valve. The timed pressure rise provided by trimmer valve 461 is rapid, occurring in a short period, i.e. 1 to 3 seconds. The faster rising, relative to time, trimmer valve regulated pressure closely follows the slower, relative to time, manually controlled rate of rise of the neutral first regulated pressure when these pressures overlap to provide a smooth transition from curve a to trimmer curve, FIG. 8, at any position.

When the compressor discharge pressure indicates the engine power and torque demand has reached a near idle value normally provided substantially at near idle pedal position, i.e. 5 percent power and torque at which first drive should be fully engaged in low power range, inverted modulator pressure will open overcontrol valve 286 to disable the regulator valve 298 voiding or terminating low pressure range regulation so there is a pressure rise to maximum pressure, curve $d$, and the full line pressure is transmitted from first feed line 307 to first apply line 309 so the timed trimmer valve 461 controls first drive pressure.

Near idle power or torque directly affects this transition from low range manual pressure control to high range automatic trimmer valve pressure control functionally at near idle throttle pedal position and always results in full first drive engagement. If the pedal is moved slowly through the low pressure range from off to near idle, neutral first regulator valve 298 provides slow pressure rise, on curve $a$, for full engagement, point $f$, and at near idle power maximum pressure, 150 psi, curve $d$, to trimmer valve 461 which controls a gradual pressure rise from maximum low range pressure, i.e. 50 psi, to maximum trimmed pressure on the remaining slope portion of the trimmer curve, FIG. 8, i.e. 50 to 85 psi and in a predetermined time increases it to maximum pressure, i.e. 150 psi. If the throttle pedal is moved rapidly from off position 0 or any intermediate position to near idle position providing a pressure rise rate as large as the trimmer valve, that portion of the low range control is voided and trimmer valve engagement occurs.

Speeds at and above the low transition speed, a speed just above the fully engaged low throttle range first ratio drive speed will disable neutral first regulator valve 298 of this control so the throttle pedal when in the low range and off position will not disengage first and establish neutral, to provide overrun braking down to the low transition speed.

The throttle pedal 176 is an operator control and in conjunction with the linkage 494 and sending and receiving units 497 and 315 and the controlled shift regulator valve 298 provides operator control means to jointly control fuel feed and pressure regulation for a neutral first shift selectively providing neutral, any rate of engagement to obtain the desired degree of slip of engagement to control the softness of the shift, any degree of a slipping first drive for a variable speed first drive and a timed automatically controlled rate of engagement of first drive for a minimum slip shift. The overcontrol means, valve 286, insures full engagement pressure when output speed is above low power first drive speed to provide engine braking at speeds where engine braking would be useful and desired, when engine torque or torque demand is above near idle indicating that the engine is operating in a high power range and that a less gradual shift should be made for proper performance and when the transmission is conditioned for reverse drive where a gradual shift engagement is not required.

During first drive, the other ratio drive establishing devices are exhausted to disestablish the other drives. The second brake apply line 419 is connected by the doenshifted two-three relay valve 406 to one-two shift feed line 398 which is connected by downshifted one-two relay valve 378 to the exhaust line 306 for disestablishing the second speed brake 82. The third speed brake apply line 436 is connected by the downshifted three-four relay valve 424 to the restricted branch 435 and two-three shift feed line 415 which is connected by the downshifted two-three relay valve to the exhaust branch 416 and line 306 to disengage third brake 76. The fourth speed clutch apply line 432 is connected via the downshifted three-four relay valve 424 to the reverse line 195 which is connected to exhaust at the selectro valve 191 to disengage the fourth clutch 63.

When the speed of the vehicle increases, so that governor pressure in line 236 upshifts the one-two shift signal valve 316 against the spring bias reduced downshifted modulator pressure selector from line 248, the exhaust 323 is closed and the main line 117 supplies pressure to the one-two shift signal line 322 which acts in chamber 401 to upshift the one-two relay valve 378 from the downshifted position against the spring bias to the upshifted position. Upshifted one-two relay valve 378 connects the neutral-one shift line 307 which had engaged first speed via the neutral-one shift valve 298 to the exhaust line 306 to disengage first speed and connects the priority main line 393 between lands *a* and *b* to the one-two shift feed line 398 which is connected by the restricted branch 418 between lands *b* and *c* of the downshifted two-three relay valve 406 to the second brake apply line 419 for engagement of the second speed.

At a higher speed, governor pressure similarly upshifts the two-three shift signal valve 341 which will disconnect the second, third shift signal line 354 from exhaust 353 and connect it to main line. The second-third shift signal line 354 is connected to chamber 422 of two-three relay valve 411 to upshift this valve to the upshift position connecting the second brake apply line 419 by restricted exhaust 421 to the low pressure exhaust line 306 and connects the unrestricted branch 417 of the one-two shift line 398 to the second-third shift feed line 415 which is connected via restricted branch 435 and between the lands *b* and *c* of downshifted three-four relay valve 424 to the third brake apply line 436 to engage third speed drive.

At a still higher speed the governor pressure will upshift the three-four shift signal valve 358 to disconnect the three-four shift signal 371 from exhaust 372 and connect it to main line 117 to supply pressure to the chamber 438 to upshift the three-four relay valve 424. This upshifted relay valve will then connect third brake apply line 436 to restricted exhaust 437 and the low pressure exhaust line 306 and connect the two-three shift feed line 415 via restriction 434 to the fourth clutch apply line 432 to engage fourth speed drive.

Since the drive four line via the priority valve 392 and priority drive four line 393 sequentially feeds the one-two, two-three and three-four relay valves only one of the first, second, third and fourth speeds can be engaged and failure of any shift relay valve to upshift will prevent engagement of all higher speed drives. Since the shift signal valves upshift sequentially with increasing speeds, the drives will be changed in this sequence.

A reduction of governor pressure and/or modulator pressure will effect a downshift of the shift signal valves sequentially, the three-four shift signal valve, the two-three shift signal valve and then the one-two shift signal valve to provide the reverse of the above described upshifting operation and thus provide downshifting in this sequence.

When the throttle pedal is in the through detent position D, which may be either just prior to, at, or just beyond full throttle position FT as shown, switch 177 is closed and through detent valve 162 supplies to detent line 174 fluid at a regulated pressure to each of the four-three shuttle valve 327, three-two shuttle valve 357 and two-one shuttle valve 332. If the hold feed pressure supplied by line 204 in the manual valve via the drive three line 201, drive two line 199 and drive one line 198 respectively is present in any of these valves the detent pressure being lower will be ineffective and remain blocked. However, if the hold feed pressure is not present in any of these valves, the detent pressure will, as explained above, move the ball 333 from the detent line 335 to the hold feed pressure seat 336 and the detent pressure will be connected to the downshift line connected to that shuttle valve. The four-three downshift line 375, the three-two downshift line 355 and the two-one downshift line 329 are respectively connected to the three-four shift signal valve 358, the two-three shift signal valve 341 and the one-two shift signal valve 316 and will provide up and down shifts of each of these shift valves at a higher speed than the normal shift speeds and remove the normal downshift bias by the spring modified by modulator pressure.

Movement of the manual selector valve 191 to the drive three position, DR3, in addition to supplying the lines supplied in drive four position, DR4, also feeds the hold feed line 204 and blocks the exhaust of the drive three feed line 201. Hold pressure is regulated by the hold regulator valve 291 when supplied with main line pressure by the hold feed line 204 and supplies hold pressure via line 217 to the drive three feed line 201 which is connected by four-three shuttle valve 377 regardless of the presence or absence of detent pressure to the four-three downshift line 375 which will downshift the three-four shift signal valve at a higher speed than detent pressure. The shift valves control the relay valves for shifting the transmission as in automatic drive but up and down shifts from third to fourth speed occur at a higher speed. Thus normal power driving would be limited to first to third speeds but coast upshifts to fourth are permitted.

Movement of the manual selector valve 191 to the drive two position, DR2, will additionally interconnect the drive three line 201 to supply hold pressure to the drive two line 199 which will be connected by the three-two shuttle valve 357 to the three-two downshift line 355 which similarly acts on the two-three shift signal valve 341 to control the two-three relay valve 406 for shifting the transmission at a higher speed than detent shifting, so normal power one-two shifts are provided with coast upshifts to third and fourth.

Movement of the manual selector valve 191 to the drive one position, DR1, additionally connects hold pressure from drive three feed line 201 to the drive one line 198 which is connected by the two-one shuttle valve 332 to the two-one downshift signal line 329 which acts on the one-two shift signal valve 316 to control the one-two relay valve 378 to shift the transmission between first and second speeds at higher speeds than the detent downshift to normally hold first speed but permit coast upshifts.

In order to make a shift to reverse the selector valve must be first moved to neutral, placing the control system in the above described neutral condition, and then to reverse R. In the reverse position R the selector valve 191 exhausts the drive four line 203 and forward knockdown line 137 through the hold feed line 204, the hold regulator valve 209 and drive three line 201 to exhaust 202. Exhausting the forward knockdown line 137 causes main pressure regulator valve 119 to increase main line pressure in line 117 to a higher value, i.e. 250 psi. The forward clutch 51, the second brake 82 and the third brake 76 are exhausted. It also exhausts the normal forward drive feed through the relay valves, which through the two-three shift line 415 with the three-four relay valve 424 upshifted feeds the fourth clutch apply line 432 or when downshifted the third brake apply line 436. To establish reverse drive the one-two relay valve 378 and three-four relay valve 424 must be in the downshifted position. The selector valve 191 in reverse position connects main line 117 to reverse line 195, which with the three-four relay valve 424 in the downshift position is connected to the fourth clutch apply line 432 to engage the fourth clutch. In addition to establishing reverse the first brake 89 must be applied. Pressure in line 195 opens the overcontrol valve 286 to provide overcontrol line 293 pressure bias on the N-1 regulator valve 298, thereby preventing reduced or low range pressure regulation by regulator valve 298 and directing main line fluid pressure in line 307 to first apply line 309 with the pressure rise for engagement controlled by first reverse trimmer valve 461. Of course, if the one-two relay valve 378 is upshifted at this time, line 307 will be exhausted through line 306 so that reverse drive cannot be engaged when the vehicle is moving forward in the second or higher gear ratio.

In the above description, references to a direction as shown on the drawing, i.e. right or left, is merely for convenience. The position and arrangement of the valves is not important since they will function as described above in any position and arrangement.

It will be appreciated that the invention may be used in the above described preferred embodiment and modifications thereof.

It is claimed:

1. In a transmission; a transmission drive train having fluid operated friction engaging drive means operative to establish a first drive in response to fluid pressure varying between a low pressure and a high pressure to provide neutral in said transmission at one of said pressures and transmitting increasing torque in first drive without slip with varying pressure and transmitting high torque in first drive without slip at the other of said pressures; a fuel feed control providing a low fuel feed phase for providing a low torque phase and a high fuel feed phase for providing high torque; and operator controlled means operatively connected to said drive means and fuel feed control having an off position providing said one pressure for neutral and positioning said fuel feed control in the low fuel feed phase and movable through a first range of movement to gradually vary said pressure for gradual engagement to transmit increasing torque merely sufficiently for drive without slip at the low torque and maintain said low fuel feed phase and then movable through a further range of movement to more rapidly vary the pressure to the other pressure for faster engagement in the high fuel feed phase for full engagement without slip for transmitting up to high torque and increasing said fuel feed control through said high fuel feed phase.

2. The invention defined in claim 1 and automatic timed pressure increasing means operatively connected to said drive means and said operator controlled means operative to regulate at the same pressure as said gradually varying pressure during said first range of movement and to provide a more rapid timed rate of increase as the pressure is varied for engagement during said further range of movement.

3. The invention defined in claim 1 and said operator controlled means maintaining said fuel feed control in said idle position during a large portion of said first range of movement and increasing said fuel feed in the terminal portion of said first range of movement to near idle and in said further range of movement moving said fuel feed control from near idle to full fuel feed.

4. The invention defined in claim 1 and said transmission having governor means providing an output speed signal and overcontrol means responsive to said output speed signal indication indicating a speed greater than first drive speed when driving in the idle fuel feed phase operatively connected to said operator controlled means to overcontrol said operator controlled means to provide said other pressure for full engagement.

5. In a transmission; a transmission drive train having an input, an output and fluid operated friction engaging first drive means operative to establish a first drive between said input and output in a low power range in response to fluid pressure varying between a minimum and maximum in a low pressure range and in a high power range in response to fluid pressure varying between a minimum pressure and a maximum pressure with the minimum pressure in the low pressure range providing neutral in said transmission and the maximum pressure in each pressure range respectively providing first drive without slip at the high power in each power range; a fuel feed control movable in a low power range from idle position to near idle position and in a high power range from near idle position to full fuel feed position and torque signal means providing a torque signal varying as a function of transmission input torque; operator controlled means having an off position providing said minimum pressure in said low pressure range for neutral and positioning said fuel feed control in said idle position and movable through a first range of movement to gradually vary said pressure to said maximum in said low pressure range for gradual engagement to transmit increasing power in said low power range and moving said fuel feed control through said low power range and movable through a further range of movement to more rapidly vary said pressure from minimum to maximum in said high pressure range for full engagement transmitting full torque without slip and moving said fuel feed control through said high power range and overcontrol means responsive to said torque signal indicating significantly more than idling torque value of transmission input torque operatively connected to said operator controlled means to overcontrol said operator controlled means to provide said high pressure range for full engagement.

6. The invention defined in claim 5 and said operator controlled means providing partial overlap between said low and high pressure ranges.

7. The invention defined in claim 5 and automatic timed pressure increasing means operatively connected to said drive means and operator controlled means operative to regulate at the same pressure when said operator control means is providing pressures in said low pressure range and to provide a timed rate of pressure increase and then a fast rise to full pressure in said high pressure range.

8. The invention defined in claim 5 and said transmission having governor means providing an output speed signal and overcontrol means responsive to said output speed signal indication indicating a speed greater than first drive speed when driving in the low power range operatively connected to said operator controlled means to overcontrol said operator controlled means to provide said other pressure for full engagement.

9. In a transmission; a fuel feed control movable in a low power range idle position to near idle position and in a high power range from beyond near idle position to full fuel feed position; a transmission having fluid operated friction engaging first drive means operative to control the establishment of a first drive in response to fluid pressure varying the drive capacity to provide in response to a minimum capacity pressure in a low capacity pressure range a positive neutral, increasing capacity pressure to a maximum capacity pressure in the low capacity pressure range engaging first drive initially with slip and then without slip at increasing capacity pressure in the low capacity pressure range as power increases in the low power range and on increasing capacity pressure from a minimum value to a maximum value in a high capacity pressure range engaging first drive with slip and then without slip at increasing capacity pressure in the high capacity range as power increases in the high power range; operator controlled means operatively connected to said drive means and to said fuel feed control and having an off position providing said minimum capacity pressure in said low capacity pressure range for neutral and positioning said fuel feed control in said idle position, movable in a first range of movement to gradually increase said capacity pressure through said low capacity pressure range for gradual engagement for drive initially with slip and then without slip at each power value up to the maximum in said low power range and moving said fuel feed control through said low power range and a second range of movement increasing the capacity pressure in said high capacity pressure range for drive initially with slip and then without slip at each power value up to the maximum power in said high power range and moving said fuel feed control through said high power range.

10. The invention defined in claim 9 and automatic timed pressure regulating means operatively connected to said drive means and operator controlled means operative to maintain the capacity pressure provided by said operator controlled means in the low capacity pressure range and operative in response to capacity pressure in said high capacity pressure range to gradually increase capacity pressure at a timed rate to engage first drive and quickly increase capacity pressure to the maximum capacity in the high capacity pressure range for first drive engagement.

11. The invention defined in claim 9 and said operator controlled means maintaining said fuel feed control in said idle position during a large portion of said first range of movement and in a terminal portion of said first range of movement increasing to near idle position varying the capacity in said low capacity pressure range for engagement and then with continued movement moving said fuel feed control from near idle to full fuel feed.

12. The invention defined in claim 9 and said transmission having governor means providing an output speed signal and overcontrol means responsive to said output speed signal indicating a speed above the maximum speed when driving in first drive in said low power range operatively connected to said operator controlled means to overcontrol said operator controlled means to provide said high capacity pressure range for engagement.

13. The invention defined in claim 9 and an engine torque demand signal means providing a torque signal and overcontrol means responsive to said torque signal means operatively connected to said operator controlled means for preventing said operator controlled means providing capacity pressure in said low capacity pressure range when engine torque is more than near idle torque.

14. The invention defined in claim 13 and an engine providing an operative pressure varying as a function of torque and torque demand and said torque demand means connected to said engine and being responsive to said engine operating pressure varying as a function of engine torque and torque demand and providing a torque demand signal varying as a function of said engine operating pressure.

15. The invention defined in claim 13 and a gas turbine engine having a compressor providing a compressor discharge pressure and said torque demand means connected to said engine and providing a torque demand signal varying as a function of compressor discharge pressure.

16. In a transmission; fuel feed control means providing fuel feed movable in a low power phase and in a high power range above the low power phase; a transmission having fluid operated friction engaging first drive means operative to control the establishment of a first drive in response to fluid pressure varying the drive capacity to provide in response to a minimum capacity pressure in a low capacity pressure range a positive neutral, increasing capacity pressure to a maximum capacity pressure in the low capacity pressure range engaging first drive initially with slip and then without slip at increasing capacity pressure in the low capacity pressure range as power increases in the low power range and on increasing capacity pressure from a minimum value to a maximum value in a high capacity pressure range engaging first drive with slip and then without slip at increasing capacity pressure in the high capacity range as power increases in the high power range; operator controlled means operatively connected to said drive means and to said fuel feed control means and having an off position providing said minimum capacity pressure in said low capacity pressure range for neutral and positioning said fuel feed control means in said low power phase, movable in a first range of movement to gradually increase said capacity pressure through said low capacity pressure range for gradual engagement for drive initially with slip and then without slip at the power value in said low power phase and maintaining said fuel feed control means in said low power phase and a second range of movement increasing the capacity pressure in said high capacity pressure range for drive initially with slip and then without slip at each power value up to the maximum power in said high power range and moving said fuel feed control means through said high power range.

17. The invention defined in laim 16 and automatic timed pressure regulating means operatively connected to said drive means and said operator controlled means only regulating the capacity pressure at a minimum capacity pressure in said high capacity pressure range, gradually increasing the capacity pressure at a timed rate for a smooth shift and then quickly increasing capacity pressure to a maximum capacity pressure in said high capacity pressure range.

18. The invention defined in claim 16 and said transmission having governor means providing an output speed signal and overcontrol means responsive to said output speed signal indication indicating a speed greater than first drive speed when driving in the low power range operatively connected to said operator controlled means to overcontrol said operator controlled means to provide said high pressure range.

19. In a transmission; a fuel feed control movable in a low power range idle position to near idle position and in a high power range from beyond near idle position to full fuel feed position; a transmission having fluid operated friction engaging first drive means operative to control the establishment of a first drive in response to increasing fluid pressure increasing the drive capacity to provide in response to a minimum pressure in a low pressure range a positive neutral, increasing pressure to a maximum pressure in the low pressure range engaging first drive initially with slip and then without slip at increasing pressure in the low pressure range as power increases in the low power range and on increasing pressure from a minimum value to a maximum value in a high pressure range engaging first drive with slip and then without slip at increasing pressure in the high pressure range as power increases in the high power range; operator controlled means operatively connected to said drive means and to said fuel feed control and having an off position providing said minimum pressure in said low pressure range for neutral and positioning said fuel feed control in said idle position, movable in a first range of movement to gradually increase said pressure through said low pressure range for gradual engagement for drive initially with slip and then without slip at each power value up to the maximum in said low power range and moving said fuel feed control through said low power range and a second range of movement increasing the pressure in said high pressure range for drive initially with slip and then without slip at each power value up to the maximum power in said high power range and moving said fuel feed control through said high power range.

20. The invention defined in claim 19 and automatic timed pressure regulating means operatively connected to said drive means and said operator controlled means only regulating pressure in said high pressure range initially at a minimum value and then increasing pressure at a timed rate for a smooth shift and then to maximum value in said high pressure range.

21. The invention defined in claim 19 and torque signal means providing a torque signal and overcontrol means responsive to said torque signal means operatively connected to said operator controlled means for preventing said operator controlled means providing said low pressure range when torque is significantly more than idle torque.

22. In a transmission; transmission gear means having an input, an output, a multiratio drive gear train connecting said input and output and a plurality of fluid operated speed ratio drive means including a first forward drive means selectively operative to establish first drive and a plurality of increasing speed forward drives and a reverse drive in response to fluid pressure; a fuel feed control means movable in a low power range to near idle position and from idle position to a high power range from near idle position to full fuel feed position for controlling the fuel feed of an engine; torque signal means providing a torque signal varying as a function of input torque and torque demand; governor means operatively connected to said output providing a governor signal varying as a function of output speed; a source of fluid at a high regulated pressure; shift control means including manual forward reverse control means and automatic forward shift control means operatively connected to said governor means, said torque signal means, said source and said plurality of drive engaging devices manually operable to selectively supply fluid to engage said reverse drive or supply fluid to said automatic forward shift control means to provide a first drive apply pressure and to engage said increasing speed ratio drives to provide increasing speed ratio forward drives with increasing speed and reducing torque demand; said first speed forward drive engaging means being operative in response to fluid pressure and having a power capacity proportional to the fluid pressure and providing slip and non slip drive as the capacity provided by the pressure approaches and equals the capacity required; a shift regulator valve means operatively connected to said automatic shift control means for controlling said first drive apply pressure; operator controlled means operatively connected to and controlling said fuel feed control means and said shift regulator valve means to provide in an off position a minimum pressure less than required for engaging said first drive means for neutral and positioning said fuel feed control means in said idle position and on slow movement through a first range of movement from off position to near idle position to gradually increase said pressure for gradual engagement of said first drive means initially with slip and then without slip at increasing pressures in a low capacity pressure range as power increases in said low power range and moving said fuel feed control means from said idle position to said near idle position and thereafter moving said fuel feed control in a second range from near idle position to full fuel feed position to provide said high source pressure and moving said fuel feed control means from near idle position to full fuel feed position; overcontrol means operatively connected to said shift control means, said governor means and said torque signal means operative to overcontrol said shift regulator valve to provide said high source pressure at all times in response to said governor signal indicating output speed above first drive speed in the low power range, said torque signal indicating input torque at input near idle torque and selection of reverse drive and automatic timed pressure control means connected to said automatic shift control means to control said first drive apply pressure only when at said high source pressure value for a timed pressure increase rate for quick smooth engagement of first drive and not affecting pressures in said low pressure range.

* * * * *

PO-1050
(5/69)

UNITED STATES PATENT OFFICE
CERTIFICATE OF CORRECTION

Patent No. 3,800,629             Dated April 2, 1974

Inventor(s) Carl A. Lentz

It is certified that error appears in the above-identified patent and that said Letters Patent are hereby corrected as shown below:

In the Specification: Column 14, line 64, "valve" should be -- valves --; Column 15, line 10, "large" should be -- larger --; Column 15, line 23, "supply" should be -- apply --; Column 16, line 12, "tthe" should be -- the --; Column 19, line 17, "exhasuted" should be -- exhausted --; Column 19, line 19, "doenshifted" should be -- downshifted --; Column 19, line 31, "selectro" should be -- selector --; Column 19, line 34, after "reduced" insert -- by --; Column 19, line 66, after "signal" insert -- line --.

Signed and sealed this 13th day of August 1974.

(SEAL)
Attest:

McCOY M. GIBSON, JR.              C. MARSHALL DANN
Attesting Officer                 Commissioner of Patents